(12) United States Patent
Park (10) Patent No.: US 9,294,181 B2
(45) Date of Patent: Mar. 22, 2016

(54) METHOD AND APPARATUS FOR SWITCHING ANTENNA IN PORTABLE TERMINAL

(75) Inventor: Sung Ryong Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 183 days.

(21) Appl. No.: 13/478,674

(22) Filed: May 23, 2012

(65) Prior Publication Data

US 2012/0315851 A1 Dec. 13, 2012

(30) Foreign Application Priority Data

Jun. 7, 2011 (KR) .................. 10-2011-0054735

(51) Int. Cl.
*H04W 88/02* (2009.01)
*H04B 1/40* (2015.01)
*H04B 7/00* (2006.01)
*H04B 7/08* (2006.01)

(52) U.S. Cl.
CPC ............ *H04B 7/0814* (2013.01); *H04B 7/0817* (2013.01)

(58) Field of Classification Search
CPC ........................... H04B 7/0814; H04B 7/0817
USPC ............... 455/41.2, 63.1, 75, 550.1; 343/702; 375/224
See application file for complete search history.

(56) References Cited

U.S. PATENT DOCUMENTS

| 7,024,232 | B2 | 4/2006 | Ponce De Leon et al. | |
|---|---|---|---|---|
| 2005/0185707 | A1* | 8/2005 | Hoo et al. | 375/224 |
| 2009/0176454 | A1* | 7/2009 | Chen et al. | 455/63.1 |
| 2009/0295648 | A1* | 12/2009 | Dorsey | H01Q 1/2266 343/702 |
| 2010/0022197 | A1* | 1/2010 | Kato et al. | 455/75 |
| 2010/0248799 | A1* | 9/2010 | Lum | H01Q 21/28 455/575.7 |
| 2010/0271261 | A1* | 10/2010 | Waters et al. | 342/357.77 |
| 2010/0285759 | A1 | 11/2010 | Chung et al. | |
| 2011/0250928 | A1* | 10/2011 | Schlub et al. | 455/550.1 |
| 2012/0071203 | A1* | 3/2012 | Wong | 455/550.1 |

FOREIGN PATENT DOCUMENTS

| KR | 10-2005-0024090 A | 3/2005 |
|---|---|---|
| KR | 10-2010-0120485 A | 11/2010 |

* cited by examiner

*Primary Examiner* — Wesley Kim
*Assistant Examiner* — Raj Chakraborty
(74) *Attorney, Agent, or Firm* — Jefferson IP Law, LLP (57) ABSTRACT

A method and apparatus of switching an antenna in a portable terminal having a plurality of antennas, a plurality of communication modules, and a switch unit for switching a wireless path are provided. The method includes determining whether a received signal strength of at least one communication module is reduced to or below a preset reference value, measuring, when the received signal strength of the at least one communication module is determined to be reduced to or below the preset reference value, respective received signal strengths of the plurality of the antennas with respect to a frequency band supported by the at least one communication module, and controlling the switch unit, based on the measurement result, such that a wireless path is formed between the at least one communication module and an antenna having a greatest received signal strength among the plurality of the antennas.

19 Claims, 7 Drawing Sheets

METHOD AND APPARATUS FOR SWITCHING ANTENNA IN PORTABLE TERMINAL

PRIORITY

This application claims the benefit under 35 U.S.C.§119(a) of a Korean patent application filed on Jun. 7, 2011 in the Korean Intellectual Property Office and assigned Serial No. 10-2011-0054735, the entire disclosure of which is hereby incorporated by reference.

BACKGROUND OF THE INVENTION

1. Field of the Invention

The present invention relates to a method and an apparatus for switching an antenna in a portable terminal. More particularly, the present invention relates to a method and an apparatus for switching an antenna in a portable terminal having a plurality of antennas in which an appropriate antenna is selected among the plurality of antennas to form a wireless path depending on a circumstance.

2. Description of the Related Art

Recently, with the advancement of information and communications technology and semiconductor technology, the distribution and use of a portable terminal is rapidly growing. In addition, the portable terminal has become commonplace in a modern life. Such portable terminal provides various functions. For example, the portable terminal provides not only a general mobile communication service such as voice calls or messages but also various features including a Tele-Vision (TV) feature (e.g., mobile broadcasting such as Digital Multimedia Broadcasting (DMB) and Digital Video Broadcasting (DVB)), music playback (e.g., Moving Picture Experts Group (MPEG)-1 or MPEG-2 Audio Layer-3 (MP3)), a camera feature, a data communication feature, an Internet feature, and a location information service feature. Particularly, the portable terminal recently provides multiple wireless communication functions such as a Global Positioning System (GPS) function, a Bluetooth function, a Wi-Fi function and a Wireless Broadband (WiBro) function.

The portable terminal is equipped with a plurality of antennas to provide a variety of wireless communication services as described above. For example, the portable terminal can include a mobile communication antenna for providing a mobile communication service, a GPS antenna for receiving a GPS signal, a Bluetooth antenna for enabling Bluetooth communication, a Wi-Fi antenna for enabling Wi-Fi communication, and a WiBro antenna for enabling WiBro communication.

Meanwhile, the above antennas have characteristics such that a resonance frequency thereof is changed when a metal component or a human body is adjacent thereto. This is problematic because a wireless performance is degraded when the resonance frequency is shifted. To address this problem, the above antennas are typically mounted in a location that does not often come into a contact with a user's body. However, as the portable terminal is equipped with a plurality of antennas, it becomes nearly impossible to mount all the antennas onto a part of the portable terminal that does not often come into the contact with the user's body. Accordingly, the portable terminal of the related art has a problem in that, when gripped by the user, the wireless performance of the antenna is degraded. Also, the portable terminal of the related art has a problem of inefficiency in that a plurality of antennas are equipped with the portable terminal and several antennas have a similar frequency band. Accordingly, there is a need for a technique to efficiently utilize an antenna while preventing the degradation of the wireless performance in a portable terminal having a plurality of antennas.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for switching an antenna in a portable terminal having a plurality of antennas in which each communication module is configured to form a wireless path with an appropriate antenna among the plurality of antennas, depending on a circumstance.

Another aspect of the present invention is to provide a method and an apparatus for switching an antenna in a portable terminal having a plurality of antennas in which, when a received signal strength of a communication module is lower than a preset reference value, respective received signal strength of the plurality of antennas is measured with respect to a frequency band supported by the corresponding communication module and the corresponding communication module is configured to form a wireless path with an antenna having the greatest received signal strength.

Another aspect of the present invention is to provide a method and an apparatus for switching an antenna in a portable terminal having a plurality of antennas in which, when a sensor signal indicating the portable terminal being gripped is received, respective received signal strength of the plurality of antennas is measured with respect to a frequency band supported by the corresponding communication module and the corresponding communication module is configured to form a wireless path with an antenna having the greatest received signal strength.

According to an aspect of the present invention, a method of switching an antenna in a portable terminal having a plurality of antennas, a plurality of communication modules, and a switch unit for switching a wireless path between the plurality of the antennas and the plurality of the communication modules is provided. The method includes determining whether a received signal strength of at least one communication module among the plurality of the communication modules is reduced to or below a preset reference value, measuring, when it is determined that the received signal strength of the at least one communication module is reduced to or below the preset reference value, respective received signal strengths of the plurality of the antennas with respect to a frequency band supported by the at least one communication module, and controlling the switch unit, based on the measurement result, such that a wireless path is formed between the at least one communication module and an antenna having a greatest received signal strength among the plurality of the antennas.

According to another aspect of the present invention, an apparatus for switching an antenna in a portable terminal is provided. The apparatus includes a plurality of antennas, a plurality of communication modules corresponding to the plurality of the antennas, a switch unit positioned between the plurality of the antennas and the plurality of the communication modules and configured to switch a wireless path there between, and a controller configured to determine whether a received signal strength of at least one communication module among the plurality of the communication modules is reduced to or below a preset reference value, configured to measure, when it is determined that the received signal strength of the at least one communication module is reduced to or below the preset reference value, respective received signal strengths of the plurality of the antennas with respect to each frequency band supported by the at least one communication module, and configured to control the switch unit, based on the measurement result, such that a wireless path is formed between the at least one communication module and an antenna having a greatest received signal strength among the plurality of the antennas.

According to yet another aspect of the present invention, a method of switching an antenna in a portable terminal having a plurality of antennas, a plurality of communication modules, and a switch unit for switching a wireless path between the plurality of the antennas and the plurality of the communication modules is provided. The method includes determining whether a sensor signal, corresponding to at least one of a gripping of the portable terminal and a contact with a human body, is received, measuring, when it is determined that the sensor signal is received, received signal strengths of the plurality of the antennas with respect to one or more frequency bands corresponding to respective communication modules of the plurality of the communication modules, and controlling the switch unit such that a wireless path is formed between each of the respective communication modules and an antenna having a greatest received signal strength with respect to a corresponding frequency band.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a portable terminal having three communication modules and three antennas will be discussed as an example. However, the present invention is not limited to this example. For example, the present invention can be applied to a portable terminal having two or more antennas and two or more communication modules.

Figure 1:
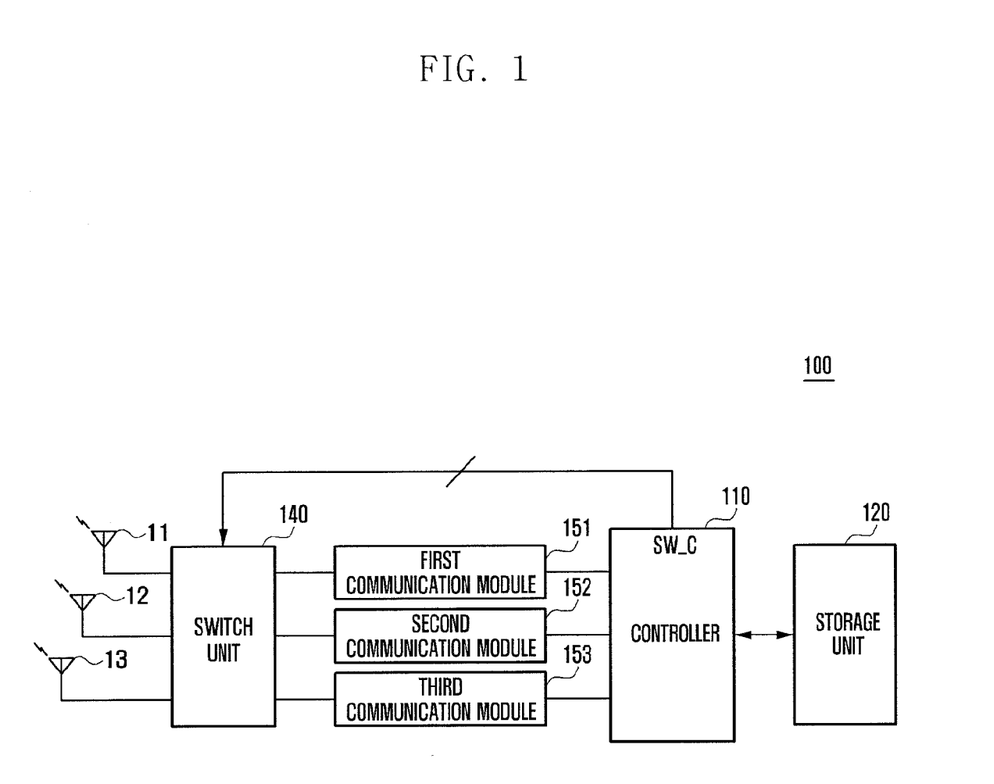
FIG. 1 is a block diagram illustrating a schematic configuration of a portable terminal according to a first exemplary embodiment of the present invention.
Figure 2:
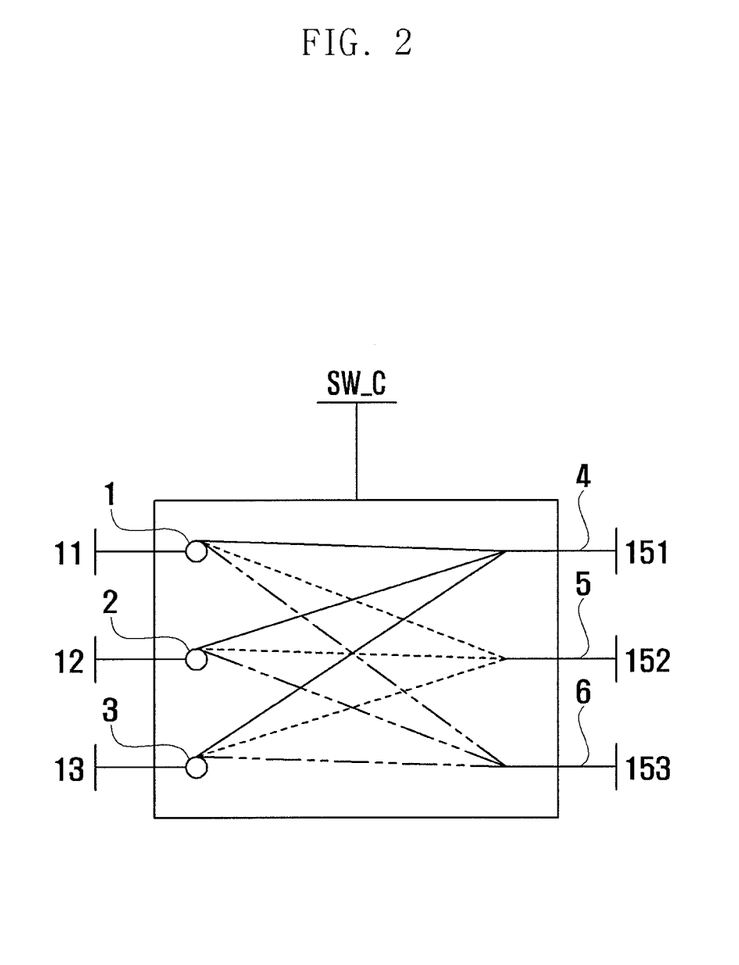
FIG. 2 is a view illustrating in detail a switch unit of the portable terminal according to the first exemplary embodiment of the present invention.

FIG. 1 is a block diagram illustrating a schematic configuration of a portable terminal according to a first exemplary embodiment of the present invention, and FIG. 2 is a view illustrating in detail a switch unit of the portable terminal according to the first exemplary embodiment of the present invention.

Referring to FIGS. 1 and 2, the portable terminal 100 according to the first exemplary embodiment of the present invention may include a first antenna 11, a second antenna 12, a third antenna 13, a switch unit 140, a first communication module 151, a second communication module 152, a third communication module 153, a storage unit 120 and a controller 110. The portable terminal 100 may also include other components not shown here for purposes of convenience, such as an input unit or a display unit. Similarly, the functionality of two or more of the above components may be integrated into a single component. Also, various components may be implemented in hardware, or as a combination of hardware software according to design.

The first communication module 151, the second communication module 152 and the third communication module 153 can transmit and receive a radio signal through the first antenna 11 through the third antenna 13. For example, the first communication module 151 through the third communication module 153 can transmit the radio signal to another terminal or receive the radio signal from the other terminal via the first antenna 11 through the third antenna 13. The first communication module 151 through the third communication module 153 can include a matching unit (not shown), a radio frequency transmitting unit (not shown) for performing an up conversion and amplification on a frequency of a transmission signal, a radio frequency receiving unit (not shown) for performing low noise amplification and a down conversion on a frequency of a received signal, and a transmitter/receiver separator for separating the received signal and the transmission signal. Here, when the first communication module 151 through the third communication module 153 provides a receiver function only, the radio frequency transmitting unit may be omitted.

The first communication module 151 through the third communication module 153 can be a communication module that supports different communication modes. For example, the first communication module 151 can be a mobile communications module for providing a mobile communication service, the second communication module 152 can be a Global Positioning System (GPS) module for processing a GPS signal, and a third communication module 153 can be a short-range wireless communication module for supporting a short-range wireless communication. Here, the mobile communication module can be a communication module that supports at least one of the mobile communication service including Code Division Multiple Access (CDMA), Wideband Code Division Multiplex Access (WCDMA), Global System for Mobile communication (GSM), General Packet Radio Service (GPRS), Enhanced Data GSM Environment (EDGE), Long Term Evolution (LTE), etc. The short-range wireless communication module can be at least one of a Bluetooth communication module that transmits and receives Bluetooth signals, a Wi-Fi communication module that transmits and receives Wi-Fi signals, etc. However, the present invention is not limited to these examples. For example, the first communication module 151 through the third communication module 153 can be any one of a Wireless Broadband (WiBro) communication module for processing a WiBro signal, a Frequency Modulation (FM) radio communication module for processing an FM radio signal, a broadcast receiving module for processing a digital broadcast signal, etc. Particularly, the first communication module 151 through the third communication module 153 according to the present exemplary embodiment can transmit and receive the radio signal through the first antenna 11 through the third antenna 13, respectively, in a normal state. On the other hand, when the portable terminal 100 is not in the normal state, for example, when a received signal strength is decreased below a preset reference value (e.g., −100 dBm), the first communication module 151 through the third communication module 153, under the control of the controller 110 can transmit and receive the radio signal through one of the first antenna 11 through the third antenna 13. This will be further described below with reference to the switch unit 140 and the controller 110.

The first antenna 11 through the third antenna 13 respectively correspond to frequency bands of the first communication module 151 through the third communication module 153. In other words, the first antenna 11 is an antenna designed in correspondence to a frequency band of the first communication module 151, the second antenna 12 is an antenna designed in correspondence to a frequency band of the second communication module 152, and the third antenna 13 is an antenna designed in correspondence to the third communication module 153. In other words, in the normal state, the first antenna 11 has a resonant frequency corresponding to the frequency band of the first communication module 151, the second antenna 12 has a resonant frequency corresponding to the frequency band of the second communication module 152, and the third antenna 13 has a resonant frequency corresponding to the frequency band of the third communication module 153. However, when a user grips the portable terminal 100, the resonant frequency of the first antenna 11 through the third antenna 13 can be changed. For example, when the user grips the portable terminal 100, the first antenna 11 may have the resonance frequency corresponding to the frequency band of the second communication module 152, the second antenna 12 may have the resonance frequency corresponding to the frequency band of the third communication module 153, and the third antenna 13 may have the resonance frequency corresponding to the frequency band of the first communication module 151. Meanwhile, it is described above that the resonance frequencies of the first antenna 11 through the third antenna 13 are changed; however, the present invention is not limited to this example. In other words, the resonance frequency of an antenna, which is installed a distance away from a part gripped by the user, may not have changed or may be changed within a range that does not have a significant impact on a receiving performance of the antenna. The first antenna 11 through the third antenna 13 can be any one of the mobile communication antenna, the GPS antenna, the short-range wireless communication antenna, the WiBro antenna, the FM radio communication antenna, the broadcast receiving antenna, etc. The mobile communication antenna can be an antenna for transmitting and receiving the radio signal in at least one of CDMA, WCDMA, GSM, GPRS, EDGE, LTE, etc. The short-range wireless communication antenna can be a Bluetooth antenna that transmits and receives at least one of the Bluetooth signals, a Wi-Fi antenna that transmits and receives the Wi-Fi signals, etc.

The switch unit 140 is positioned between the first antenna 11 through the third antenna 13 and the first communication module 151 through the third communication module 153 to switch a wireless path between the first antenna 11 through the third antenna 13 and the first communication module 151 through the third communication module 153. More specifically, referring to FIG. 2, the switch unit 140 can include a first input terminal 1 connected to the first antenna 11, a second input terminal 2 connected to the second antenna 12, a third input terminal 3 connected to the third antenna 13, a first output terminal 4 connected to the first communication module 151, a second output terminal 5 connected to the second communication module 152, and a third output terminal 6 connected to the third communication module 153.

The first output terminal 4 is connected to the first input terminal 1 in a default state. On the other hand, when the received signal strength of the first communication module 151 is decreased below a first reference value, the first output terminal 4 can be connected to at least one of the first input terminal 1 through the third input terminal 3 according to a control signal SW_C of the controller 110. The second output terminal 5 is connected to the second input terminal 2 in the default state. On the other hand, when the received signal strength of the second communication module 152 is decreased below a second reference value, the second output terminal 5 can be connected to at least one of the first input terminal 1 through the third input terminal 3 according to the control signal SW_C of the controller 110. In addition, the third output terminal 6 is connected to the third input terminal 3 in the default state. On the other hand, when the received signal strength of the third communication module 153 is decreased below a third reference value, the third output terminal 6 can be connected to at least one of the first input terminal 1 through the third input terminal 3 according to the control signal SW_C of the controller 110. Herein, the first, second, and third reference values may be the same reference value or different reference values.

The storage unit 120 may include, for example, a program required to perform a function in accordance an exemplary embodiment of the present invention and a user data. For example, the storage unit 120 may include a program for controlling an overall operation of the portable terminal 100, an Operating System (OS) for booting the portable terminal 100, or an application program for optional features of the portable terminal 100 such as, for example, a camera feature, a sound playback feature, an image or video playback feature, a short-range wireless communication feature, etc. In addition, the storage unit 120 can store a user data generated according to a use of the portable terminal 100 such as, for example, text messages, games, files, music files, movie files, contacts, etc. Particularly, the storage unit 120 according to the present exemplary embodiment can store a program for controlling a switching operation of the switch unit 140 in a manner such that, whether the received signal strength of at least one of a plurality of communication modules is decreased below a predetermined reference value is determined, the received signal strength of a plurality of antennas is measured in the frequency band supported by at least one communication module of which received signal strength is decreased below the predetermined reference value, and, based on the measurement result, the at least one communication module is connected to an antenna of which received signal strength is highest among the plurality of the antennas. Meanwhile, it is described above that the plurality of the communication modules use an identical reference value, however, the storage unit 120 can store a reference value that is set differently for each communication module.

The controller 110 can control the overall operation of the portable terminal 100 and a signal flow between internal blocks of the portable terminal 100. In particular, the controller 110 according to the present exemplary embodiment can transmit the control signal SW_C to a control terminal of the switch unit 140 to control the switching operation of the switch unit 140. Specifically, the controller 110 can determine whether the received signal strength of at least one of the first communication module 151 through the third communication module 153 is decreased below the predetermined reference value. When it is determined that the received signal strength of the at least one of the first communication module 151 through the third communication module 153 is decreased below the predetermined reference value, the controller 110 can control to measure a reception strength of the first antenna 11 through the third antenna 13 in the frequency band supported by the at least one communication module.

Next, based on the measurement result, the controller 110 can control the switch unit 140 such that a wireless path is formed between the at least one communication module and an antenna having the greatest reception strength among the first antenna 11 through the third antenna 13. For example, when the received signal strength of the second communication module 152 is below the reference value, the controller 110 can subsequently connect the second communication module 152 with the first antenna 11 through the third antenna 13 to measure the received signal strength of each antenna when connected to the second communication module 152. Next, the controller 110 can control the switch unit 140 such that a wireless path is formed between the second communication module 152 and an antenna having the greatest measured received signal strength. For example, when the first antenna 11 has the greatest received signal strength, the controller 110 can control the switch unit 140 such that the second communication module 152 is connected to the first antenna 11.

Meanwhile, when an antenna having the greatest received signal strength with respect to the plurality of the communication modules is overlapped, the controller 110 can control the switch unit 140 such that the plurality of the communication modules share a single antenna. In addition, the communication module of which transmission frequency band and reception frequency band are different to each other can be connected to different antennas in transmission and reception modes. For example, when the transmission frequency band and the reception frequency band of the first communication module 151 are different to each other, the controller 110 can control the switch unit 140 such that the first communication module 151 is connected to the first antenna 11 in the reception mode and is connected to the second antenna 12 in the transmission mode.

Figure 3:
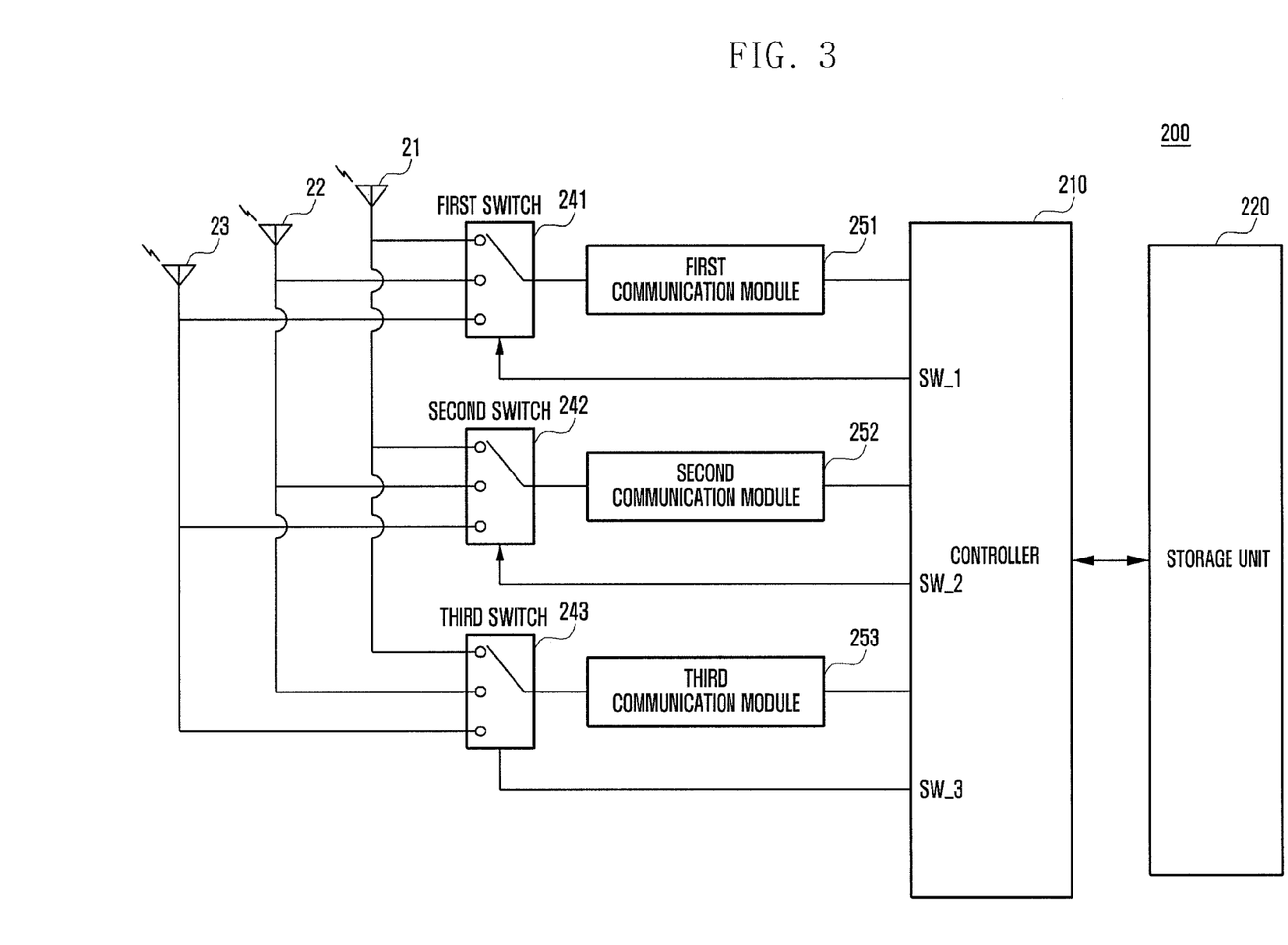
FIG. 3 is a block diagram illustrating a schematic configuration of a portable terminal according to a second exemplary embodiment of the present invention.

FIG. 3 is a block diagram illustrating a schematic configuration of a portable terminal according to a second exemplary embodiment of the present invention.

Referring to FIG. 3, a portable terminal 200 according to the second embodiment of the present invention may include a first antenna 21, a second antenna 22, a third antenna 23, a first switch 241, a second switch 242, a third switch 243, a first communication module 251, a second communication module 252, a third communication module 253, a controller 210 and a storage unit 220. The portable terminal 200 may also include other components not shown here for purposes of convenience, such as an input unit or a display unit. Similarly, the functionality of two or more of the above components may be integrated into a single component. Also, various components may be implemented in hardware, or as a combination of hardware software according to design.

In the portable terminal 200 according to the second exemplary embodiment of the present invention, instead of the switch unit 140 of the portable terminal 100 according to the first exemplary embodiment, the first switch 241, the second switch 242 and the third switch 243 are included. Accordingly, the controller 210 includes three control terminals for controlling the first switch 241 through the third switch 243. For example, the controller 210 can include a first control terminal SW_1 for controlling a switching operation of the first switch 241, a second control terminal SW_2 for controlling a switching operation of the second switch 242, and a third control terminal SW_3 for controlling a switching operation of the third switch 243. Except for this feature, the portable terminal 200 according to the second exemplary embodiment of the present invention has substantially the same configuration as the portable terminal 100 according to the first exemplary embodiment. Thus, a further description of the portable terminal 200 according to the second exemplary embodiment of the present invention will be omitted to avoid duplicate explanations of the same elements.

Figure 4:
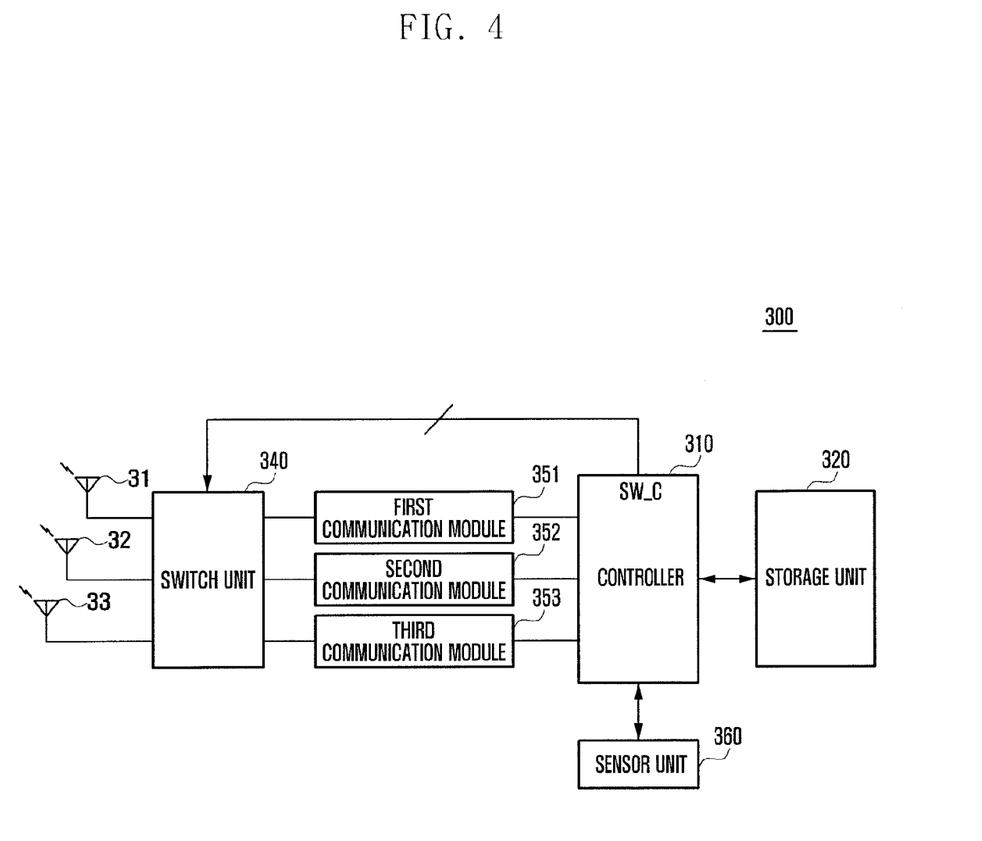
FIG. 4 is a block diagram illustrating a schematic configuration of a portable terminal according to a third exemplary embodiment of the present invention.
Figure 5:
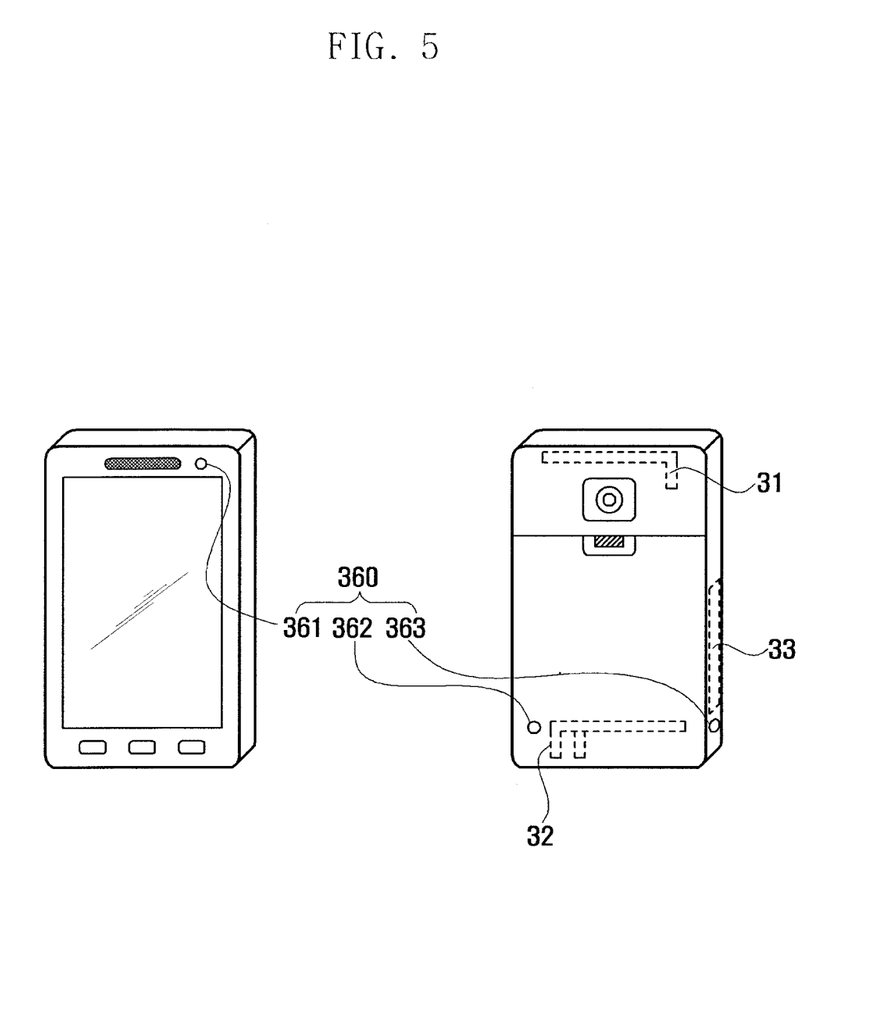
FIG. 5 is a view illustrating an exterior appearance of the portable terminal according to the third exemplary embodiment of the present invention.

FIG. 4 is a block diagram illustrating a schematic configuration of a portable terminal according to a third exemplary embodiment of the present invention, and FIG. 5 is a view illustrating an exterior appearance of the portable terminal according to the third exemplary embodiment of the present invention.

Referring to FIGS. 4 and 5, a portable terminal 300 according to the third embodiment of the present invention may include a sensor unit 360, a first antenna 31, a second antenna 32, a third antenna 33, a switch unit 340, a first communication module 351, a second communication module 352, a third communication module 353, a storage unit 320 and a controller 310. The sensor unit 360 may include a first sensor 361, a second sensor 362 and a third sensor 363. The portable terminal 300 may also include other components not shown here for purposes of convenience, such as an input unit or a display unit. Similarly, the functionality of two or more of the above components may be integrated into a single component. Also, various components may be implemented in hardware, or as a combination of hardware software according to design.

The portable terminal 300 according to the third exemplary embodiment of the present invention may further include the sensor unit 360 in addition to the configuration of the portable terminal 100 according to the first exemplary embodiment. The sensor unit 360 is a sensor for detecting at least one of a gripping of the portable terminal 300 and a physical contact between the user and the portable terminal 300, etc. The sensor 360 can include, for example, at least one of a proximity sensor, a body sensor, etc. For example, the sensor unit 360 according to the present exemplary embodiment can include the first sensor 361 for detecting a gripping near the first antenna 31, the second sensor 362 for detecting a gripping near the second antenna 32 and the third sensor 363 for detecting a gripping near the third antenna 33. To this end, the first sensor 361 through the third sensor 363 are preferably positioned near the first antenna 31 through the third antenna 33, as shown in FIG. 5.

When a sensor signal indicating the user's gripping of the portable terminal 300 is received from the sensor unit 360, the controller 310 can measure the received signal strength of the first antenna 31 through the third antenna 33 with respect to each frequency band of the first communication module 351 through the third communication module 353 and control, based on the measurement result, the switch unit 340 such that a wireless path is formed between a corresponding communication module and an antenna having the greatest received signal strength in each frequency band. Alternatively, the controller 310 can measure the received signal strength of the first antenna 31 through the third antenna 33 with respect to the frequency band of a communication module that corresponds to a received sensor signal. For example, when a signal is received from the first sensor 361, the controller 310 may measure the received signal strength of the first antenna 31 through the third antenna 33 with respect to the frequency band of the first communication module 351. Alternatively, when a signal is received from both the second sensor 362 and the third sensor 363, the controller 110 may measure the received signal strength of the first antenna 31 through the third antenna 33 with respect to the frequency band of the second communication module 352 and measure the received signal strength of the first antenna 31 through the third antenna 33 with respect to the frequency band of the third communication module 353.

A further description of the portable terminal 300 according to the third exemplary embodiment of the present invention will be omitted to avoid duplicate explanations of elements of the portable terminal 100 according to the first exemplary embodiment that have similar functions.

Figure 6:
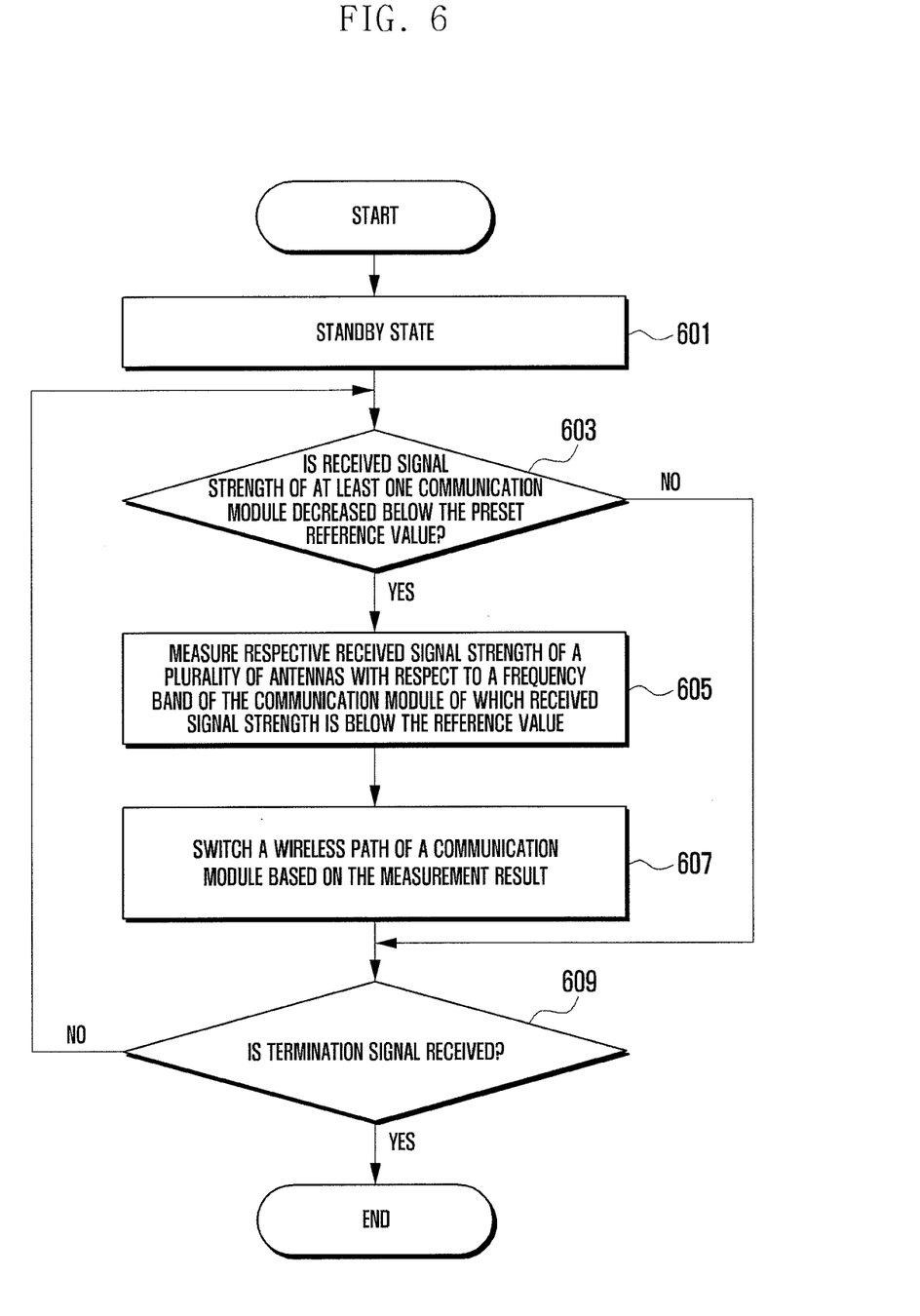
FIG. 6 is a flowchart illustrating a method of switching an antenna of a portable terminal according to the first exemplary embodiment of the present invention.

FIG. 6 is a flowchart illustrating a method of switching an antenna of a portable terminal according to the first exemplary embodiment of the present invention. Hereinafter, the portable terminal 100 according to the first exemplary embodiment is described as an example.

Referring to FIGS. 1, 2 and 6, the controller 110 according to the present exemplary embodiment may be in a standby mode in step 601. The controller 110 can determine whether the received signal strength of at least one communication module is decreased below the preset reference value (e.g., −100 dBm) in step 603. The decrease in the received signal strength below the preset reference value can be caused when the user grips the portable terminal 100, a metal or a human body is in a close proximity to the portable terminal 100 to affect the performance of the antenna, the portable terminal 100 is in a weak electric field such as, for example, basements or mountains, etc.

When there is no communication module of which received signal strength is reduced below the reference value, the controller 110 can proceed to step 609, which will be described further below. On the other hand, when the received signal strength of the at least one communication module is reduced below the reference value, the controller 110 can measure the respective received signal strength of a plurality of antennas with respect to the frequency band of the at least one communication module of which received signal strength is below the reference value in step 605. For example, when the received signal strength of the first communication module 151 and the second communication module 152 is decreased below the reference value, the controller 110 can measure the received signal strength of the first antenna 11 through the third antenna 13 in the frequency band of the first communication module 151 and measure the received signal strength of the first antenna 11 through the third antenna 13 in the frequency band of the second communication module 152.

When the measurement of the received signal strength of the plurality of the antennas is completed, the controller 110 can switch a wireless path of a corresponding communication module based on the measurement result in step 607. For example, when the measurement result indicates that the third antenna 13 has the greatest received signal strength in the frequency band of the first communication module 151, the controller 110 can control the switch unit 140 such that the first communication module 151 is connected to the third antenna 13. In other words, the controller 110 can control to switch the switch unit 140 such that the third input terminal 3 of the switch unit 140 is connected to the first output terminal 4 thereof. In addition, when the measurement result indicates that the first antenna 11 has the greatest received signal strength in the frequency band of the second communication module 152, the controller 110 can control the switch unit 140 such that the second communication module 152 is connected to the first antenna 11. In other words, the controller 110 can control to switch the switch unit 140 such that the first input terminal 1 of the switch unit 140 is connected to the second output terminal 5 thereof. Meanwhile, when the first antenna 11 has the greatest received signal strength in both the frequency bands of the first communication module 151 and the second communication module 152, the controller 110 can switch the switch unit 140 such that the first communication module 151 and the second communication module 152 are connected to the first antenna 11. In this case, the controller 110 can further perform a step to determine a coexistence performance of the first antenna 11. When the coexistence performance is poor, the controller 110 can control the switch unit 140 such that one of the first communication module 151 and the second communication module 152 is connected to an antenna having the next greatest received signal strength.

Next, the controller 110 can determine whether a termination signal is received in step 609. When the termination signal is not received, the controller 110 returns to step 603 to repeat the above described process, and when the termination signal is received, the controller 110 can perform a power-off process.

Herein, while the method of switching an antenna of a portable terminal according to the first exemplary embodiment of the present invention has been described above, a method of switching an antenna of a portable terminal according to the second exemplary embodiment of the present invention is similar thereto and thus a description thereof is omitted for brevity.

Figure 7:
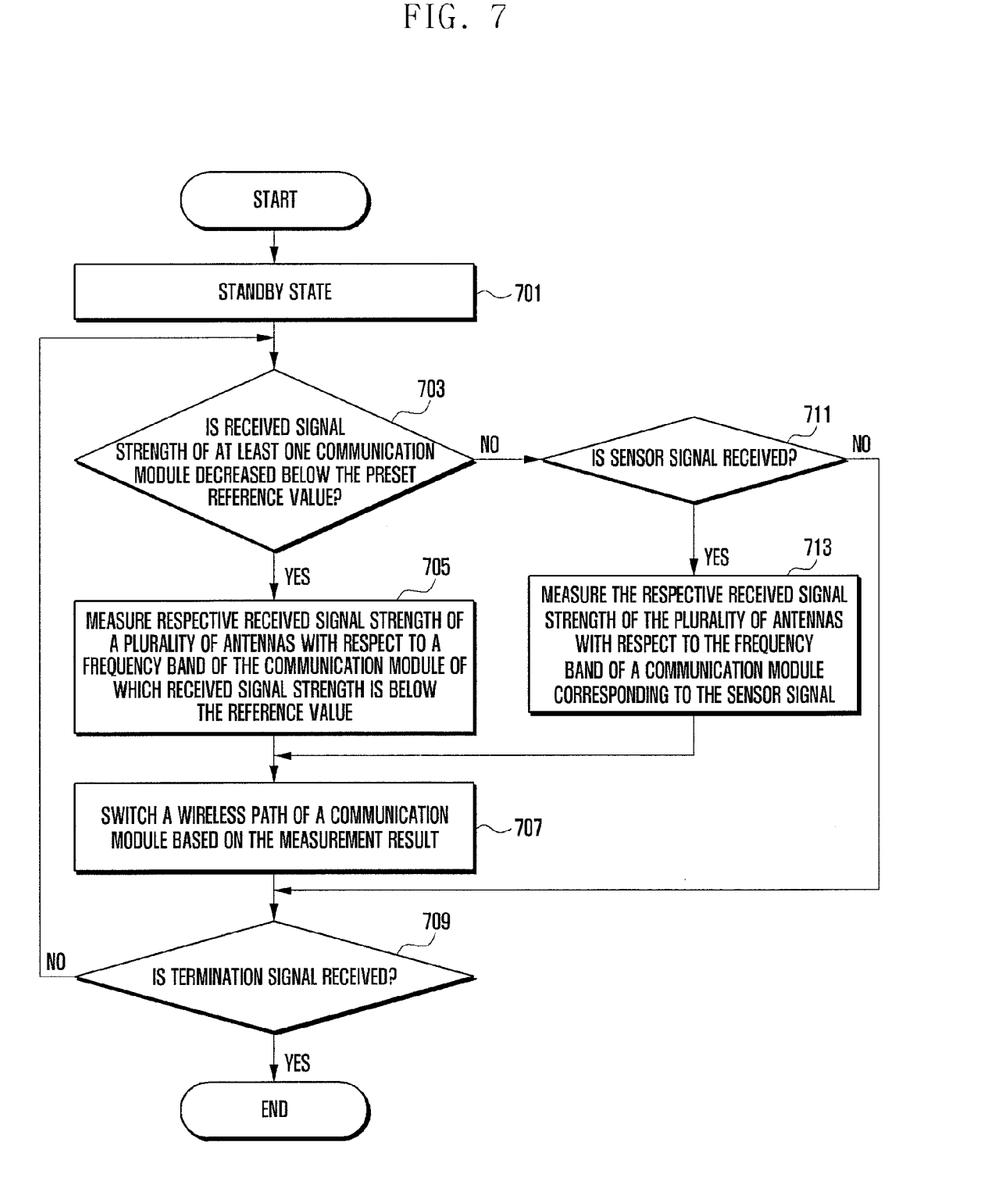
FIG. 7 is a flowchart illustrating a method of switching an antenna of a portable terminal according to the third exemplary embodiment of the present invention.

FIG. 7 is a flowchart illustrating a method of switching an antenna of a portable terminal according to the third exemplary embodiment of the present invention. Hereinafter, the portable terminal 300 according to a third exemplary embodiment is described as an example.

Referring to FIGS. 4, 5 and 7, the controller 310 according to the present exemplary embodiment may be in a standby mode in step 701. The controller 310 can determine whether the received signal strength of at least one communication module is decreased below the preset reference value (e.g., −100 dBm) in step 703. When the received signal strength of the at least one communication module is reduced below the reference value, the controller 310 can measure the respective received signal strength of a plurality of antennas with respect to the frequency band of a corresponding communication module, i.e., the communication module of which received signal strength is below the reference value in step 705. For example, when the received signal strength of the first communication module 351 and the second communication module 352 is decreased below the reference value, the controller 310 can measure the received signal strength of the first antenna 31 through the third antenna 33 in the frequency band of the first communication module 351 and measure the received signal strength of the first antenna 31 through the third antenna 33 in the frequency band of the second communication module 352.

Meanwhile, when there is no communication module of which received signal strength is reduced below the reference value, the controller 310 can determine whether a sensor signal indicating the portable terminal 300 being gripped is received in step 711. To this end, the portable terminal 300 includes the sensor unit 360 including at least one of the proximity sensor, the body sensor, etc. The sensor unit 360 may include a plurality of sensors, and each of the plurality of the sensors is preferably located adjacent to a corresponding antenna of the plurality of the antennas, as shown in FIG. 5. The purpose of this is to enable the controller 310 to distinguish an antenna and a communication module that are affected by the gripping of the portable terminal 300. For example, when a signal is received from the first sensor 361, the controller 310 can determine that the user grips near the first antenna 31 and a receiving performance of the first antenna 31 or the first communication module 351 has been lowered.

If the sensor signal is not received, the controller 310 may proceed to step 709, which will be described further below. On the other hand, if the sensor signal is received, the controller 310 can measure the respective received signal strength of the plurality of antennas with respect to the frequency band of a communication module that corresponds to the sensor signal in step 713. For example, when a signal is received from both the first sensor 361 and the second sensor 362, the controller 310 can measure the received signal strength of the first antenna 31 through the third antenna 33 in the frequency band of the first communication module 351 and measure the received signal strength of the first antenna 31 through the third antenna 33 in the frequency band of the second communication module 352.

When the measurement of the received signal strength of the plurality of the antenna is completed, the controller 310 can switch a wireless path of a corresponding communication module based on the measurement result in step 707. For example, when the measurement result indicates that the third antenna 33 has the greatest received signal strength in the frequency band of the first communication module 351, the controller 310 can control the switch unit 340 such that the first communication module 351 is connected to the third antenna 33. In addition, when the measurement result indicates that the first antenna 31 has the greatest received signal strength in the frequency band of the second communication module 352, the controller 310 can control the switch unit 340 such that the second communication module 352 is connected to the first antenna 31.

Next, the controller 310 can determine whether the termination signal is received in step 709. When the termination signal is not received, the controller 310 returns to step 703 to repeat the above described process, and when the termination signal is received, the controller 310 can perform the power-off process.

In the method of switching an antenna of a portable terminal according to the third exemplary embodiment of the present invention described above, steps 703 and 705 may be omitted.

It is described that a plurality of communication modules use an identical reference value; however, the present invention is not limited to this example. In other words, the reference value can be set separately for each communication module. In addition, it is described above that a communication module is connected to a single antenna; however, the present invention is not limited to this example. For example, when the first communication module has different transmission and reception frequency bands, the first communication module can be connected to two antennas among the plurality of the antennas. In this case, one antenna can be used for transmitting a wireless signal, and the other antenna can be used for receiving the wireless signal. Namely, the first communication module can be connected to the first antenna in the reception mode and connected to the second communication module in the transmission mode.

As described above, in a method and an apparatus for switching an antenna in a portable terminal according to exemplary embodiments of the present invention, a communication module can selectively form a wireless path with an appropriate antenna among a plurality of antennas so that an optimal antenna performance can be provided. In other words, according to the exemplary embodiments of the present invention, a communication module is not matched to a fixed antenna, but rather is connected to an appropriate antenna depending on a circumstance to transmit and receive a wireless signal. Accordingly, the exemplary embodiments of the present invention can resolve a user's complaint about degradation of wireless performance under a certain circumstance (e.g., when the portable terminal is gripped).

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of switching an antenna in a portable terminal having a plurality of antennas, a plurality of communication modules, and a switch unit for switching a wireless path between the plurality of the antennas and the plurality of the communication modules, the method comprising:
   determining whether a received signal strength of at least one communication module among the plurality of the communication modules is reduced to or below a preset reference value;
   measuring, when it is determined that the received signal strength of the at least one communication module is reduced to or below the preset reference value, respective received signal strengths of the plurality of the antennas with respect to a frequency band supported by the at least one communication module;
   controlling the switch unit, based on the measurement result, such that a wireless path is formed between the at least one communication module and an antenna having a greatest received signal strength among the plurality of the antennas;

determining whether the received signal strength of all of the plurality of the communication modules is above the preset reference value;

determining, based on the received signal strength of all of the plurality of the communication modules being above the preset reference value, whether a sensor signal, corresponding to at least one of a gripping of the portable terminal and a contact with a human body, is received;

measuring received signal strengths of the plurality of the antennas with respect to one or more frequency bands corresponding to respective communication modules of the plurality of the communication modules; and controlling the switch unit such that a wireless path is formed between each of the respective communication modules and an antenna having a greatest received signal strength with respect to a corresponding frequency band, wherein at least two communication modules among the plurality of the communication modules share the antenna having the greatest received signal strength, and wherein each of the plurality of communication modules, independently of each other of the plurality of communication modules, transmits and receives radio signals via the antenna having the greatest received signal strength.

2. The method of claim 1, wherein the plurality of communication modules support different wireless communication modes.

3. The method of claim 1, wherein the plurality of the antennas include at least two of:

a mobile communication antenna for at least one of transmitting and receiving a mobile communication signal;

a Global Positioning System (GPS) antenna configured to receive a GPS signal;

a short-range wireless communication antenna configured to at least one of transmit and receive a short-range wireless communication signal;

a Wireless Broadband (WiBro) antenna configured to at least one of transmit and receive a WiBro signal;

a radio communication antenna configured to receive a radio signal; and a broadcast receiving antenna configured to receive a digital broadcast signal.

4. The method of claim 3, wherein the short-range wireless communication antenna includes at least one of:

a Bluetooth antenna configured to perform a Bluetooth communication; and a Wi-Fi antenna configured to perform a Wi-Fi communication.

5. The method of claim 1, wherein the sensor signal comprises a plurality of sensor signals, each sensor signal corresponding to at least one of the gripping of the portable terminal and the contact with the human body, at a location on portable terminal corresponding to one of the plurality of the antennas.

6. The method of claim 1, wherein the reference value is set separately for each of the plurality of the communication modules.

7. The method of claim 1, wherein the controlling of the switch unit further comprises:

controlling such that the communication module is connected to different antennas in a transmission mode and a receipt mode when a transmission frequency band and a receipt frequency band of the communication module are different from each other.

8. An apparatus for switching an antenna in a portable terminal, the apparatus comprising:

a plurality of antennas;

a plurality of communication modules corresponding to the plurality of the antennas;

a switch unit positioned between the plurality of the antennas and the plurality of the communication modules and configured to switch a wireless path there between; and a controller configured to:

determine whether a received signal strength of at least one communication module among the plurality of the communication modules is reduced to or below a preset reference value, configured to measure, when it is determined that the received signal strength of the at least one communication module is reduced to or below the preset reference value, respective received signal strengths of the plurality of the antennas with respect to each frequency band supported by the at least one communication module, configured to control the switch unit, based on the measurement result, such that a wireless path is formed between the at least one communication module and an antenna having a greatest received signal strength among the plurality of the antennas, determine whether the received signal strength of all of the plurality of the communication modules is above the preset reference value, determine, based on the received signal strength of all of the plurality of the communication modules being above the preset reference value, whether a sensor signal, corresponding to at least one of a gripping of the portable terminal and a contact with a human body, is received;

measure received signal strengths of the plurality of the antennas with respect to one or more frequency bands corresponding to respective communication modules of the plurality of the communication modules; and control the switch unit such that a wireless path is formed between each of the respective communication modules and an antenna having a greatest received signal strength with respect to a corresponding frequency band, wherein at least two communication modules among the plurality of the communication modules share the antenna having the greatest received signal strength, and wherein each of the plurality of communication modules, independently of each other of the plurality of communication modules, transmits and receives radio signals via the antenna having the greatest received signal strength.

9. The apparatus of claim 8, wherein the plurality of the communication modules support different wireless communication modes.

10. The apparatus of claim 8, wherein the plurality of the antennas include at least two of:

a mobile communication antenna for configured to at least one of transmit or receive a mobile communication signal;

a Global Positioning System (GPS) antenna configured to receive a GPS signal;

a short-range wireless communication antenna configured to at least one of transmit or receive a short-range wireless communication signal;

a Wireless Broadband (WiBro) antenna configured to at least one of transmit or receive a WiBro signal;
a radio communication antenna configured to receive a radio signal; and
a broadcast receiving antenna configured to receive a digital broadcast signal.

11. The apparatus of claim 10, wherein the short-range wireless communication antenna includes at least one of:
a Bluetooth antenna configured to perform a Bluetooth communication; and
a Wi-Fi antenna configured to perform a Wi-Fi communication.

12. The apparatus of claim 8, further comprising:
a sensor unit configured to detect gripping of the portable terminal or a contact with a human body.

13. The apparatus of claim 12, wherein the sensor unit comprises a plurality of sensor units, each sensor unit configured to detect at least one of the gripping of the portable terminal and the contact with the human body, at a location on portable terminal corresponding to one of the plurality of the antennas.

14. The apparatus of claim 12, wherein, when a signal is received from the sensor unit, the controller is further configured to measure received signal strengths of the plurality of the antennas with respect to one or more frequency bands corresponding to respective communication modules of the plurality of the communication modules, and
wherein the controller is further configured to control the switch unit such that a wireless path is formed between each of the respective communication modules and an antenna having a greatest received signal strength with respect to a corresponding frequency band.

15. The apparatus of claim 8, further comprising:
a storage unit configured to store the reference value, wherein the reference value is set separately for each of the plurality of the communication modules.

16. The apparatus of claim 8, wherein the controller is further configured to control the switch unit such that the communication module is connected to different antennas in a transmission mode and a receipt mode when a transmission frequency band and a receipt frequency band of the communication module are different from each other.

17. The apparatus of claim 8, wherein the switch unit comprises a plurality of switch units between the plurality of the antennas and the plurality of the communication modules that are configured to switch the wireless path there between.

18. A method of switching an antenna in a portable terminal having a plurality of antennas, a plurality of communication modules, and a switch unit for switching a wireless path between the plurality of the antennas and the plurality of the communication modules, the method comprising:
determining whether a received signal strength of at least one communication module among the plurality of the communication modules is reduced to or below a preset reference value;
measuring, when it is determined that the received signal strength of the at least one communication module is reduced to or below the preset reference value, respective received signal strengths of the plurality of the antennas with respect to a frequency band supported by the at least one communication module;
controlling the switch unit, based on the measurement result, such that a wireless path is formed between the at least one communication module and an antenna having a greatest received signal strength among the plurality of the antennas;
determining whether a received signal strength of all of communication modules is above a preset reference value;
determining, based on the received signal strength of all of communication modules being above the preset reference value, whether a sensor signal, corresponding to at least one of a gripping of the portable terminal and a contact with a human body, is received;
measuring, received signal strengths of the plurality of the antennas with respect to one or more frequency bands corresponding to respective communication modules of the plurality of the communication modules; and
controlling the switch unit such that a wireless path is formed between each of the respective communication modules and an antenna having a greatest received signal strength with respect to a corresponding frequency band,
wherein at least two communication modules among the plurality of the communication modules share the antenna having the greatest received signal strength, and
wherein each of the plurality of communication modules, independently of each other of the plurality of communication modules, transmits and receives radio signals via the antenna having the greatest received signal strength.

19. The method of claim 18, wherein the sensor signal comprises a plurality of sensor signals, each sensor signal corresponding to at least one of the gripping of the portable terminal and the contact with the human body, at a location on portable terminal corresponding to one of the plurality of the antennas.

* * * * *